United States Patent
Stoker et al.

(10) Patent No.: US 10,178,290 B2
(45) Date of Patent: Jan. 8, 2019

(54) METHOD AND APPARATUS FOR AUTOMATICALLY ACQUIRING FACIAL, OCULAR, AND IRIS IMAGES FROM MOVING SUBJECTS AT LONG-RANGE

(75) Inventors: David Stoker, Burlingame, CA (US); Cregg Cowan, Mountain View, CA (US); Motilal Agrawal, San Carlos, CA (US); Jan Edward van der Laan, Palo Alto, CA (US); John Brian Burns, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 810 days.

(21) Appl. No.: 13/029,911

(22) Filed: Feb. 17, 2011

(65) Prior Publication Data

US 2012/0154536 A1 Jun. 21, 2012

Related U.S. Application Data

(60) Provisional application No. 61/305,485, filed on Feb. 17, 2010.

(51) Int. Cl.
| | |
|---|---|
| *H04N 5/00* | (2011.01) |
| *H04N 5/225* | (2006.01) |
| *H04N 5/232* | (2006.01) |
| *H04N 7/18* | (2006.01) |
| *H04N 13/239* | (2018.01) |

(52) U.S. Cl.
CPC ....... *H04N 5/2258* (2013.01); *H04N 5/23212* (2013.01); *H04N 5/23219* (2013.01); *H04N 5/23248* (2013.01); *H04N 7/18* (2013.01); *H04N 13/239* (2018.05)

(58) Field of Classification Search
CPC .................................. G06K 9/00; G09G 5/00
See application file for complete search history.

(56) References Cited

U.S. PATENT DOCUMENTS

| | | | | |
|---|---|---|---|---|
| 2001/0043163 A1* | 11/2001 | Waldern et al. | ................... | 345/7 |
| 2002/0126479 A1* | 9/2002 | Zhai et al. | ..................... | 362/244 |
| 2004/0174496 A1* | 9/2004 | Ji et al. | ......................... | 351/209 |
| 2006/0280219 A1* | 12/2006 | Shchegrov | ..................... | 372/99 |
| 2008/0187305 A1* | 8/2008 | Raskar et al. | ................ | 396/268 |
| 2009/0262182 A1* | 10/2009 | Javidi et al. | .................... | 348/46 |
| 2010/0290668 A1* | 11/2010 | Friedman et al. | ............ | 382/103 |

\* cited by examiner

*Primary Examiner* — Maryam A Nasri
(74) *Attorney, Agent, or Firm* — Moser Taboada

(57) ABSTRACT

The present invention relates to a method and apparatus for long-range facial and ocular acquisition. One embodiment of a system for acquiring an image of a subject's facial feature(s) includes a steerable telescope configured to acquire the image of the facial feature(s), a first computational imaging element configured to minimize the effect of defocus in the image of the facial feature(s), and a second computational imaging element configured to minimize the effects of motion blur. In one embodiment, the detecting, the acquiring, the minimizing the effect of the motion, and the minimizing the effect of the defocus are performed automatically without a human input.

17 Claims, 3 Drawing Sheets

METHOD AND APPARATUS FOR AUTOMATICALLY ACQUIRING FACIAL, OCULAR, AND IRIS IMAGES FROM MOVING SUBJECTS AT LONG-RANGE

CROSS REFERENCE TO RELATED APPLICATIONS

This application claims the benefit of U.S. Provisional Patent Application Ser. No. 61/305,485, filed Feb. 17, 2010, which is herein incorporated by reference in its entirety.

FIELD OF THE INVENTION

The present invention relates generally to biometric recognition applications, and relates more particularly to long-range acquisition of facial and ocular features.

BACKGROUND OF THE DISCLOSURE

The acquisition of physiological biometric features such as facial and ocular features is a necessary step in most biometric recognition applications (e.g., facial recognition, iris recognition, and the like). Several factors, however, make it difficult for conventional systems to acquire images of the quality necessary to ensure good recognition results. For instance, if the subject is in motion or is far away, or if the ambient lighting conditions are poor, the image captured may be unusable due to motion blur and/or poor focus. These difficulties are amplified if the biometric features of interest are particularly small, as is the case with the human iris.

SUMMARY OF THE INVENTION

The present invention relates to a method and apparatus for long-range facial and ocular acquisition. One embodiment of a system for acquiring an image of a subject's facial feature(s) includes a steerable telescope configured to acquire the image of the facial feature(s), a first computational imaging element configured to minimize the effect of defocus in the image of the facial feature(s), and a second computational imaging element configured to minimize the effects of motion blur. In one embodiment, the detecting, the acquiring, the minimizing the effect of the motion, and the minimizing the effect of the defocus are performed automatically without a human input.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for automatically acquiring images of faces, ocular regions, and irises at long-range from moving subjects. Embodiments of the invention combine high-resolution imaging, three-dimensional stereo tracking, active gaze monitoring, and computational imaging. This enables the present invention to acquire a high-resolution image (e.g., greater than 2 line pairs per millimeter) of a human iris or other facial features from distances greater than 20 meters, even when the subject is in motion (e.g., at a continuous speed of greater than 1.5 meters per second). Thus, the effects of motion blur and depth of focus, which inhibit conventional systems, are greatly reduced.

Moreover, embodiments of the present invention are tolerant to natural subject motion and utilize triggering schemes that allow data to be captured at just the right time. In addition, it is noted that the present invention may be used to acquire facial and ocular images of non-human as well as human subjects.

Figure 1:
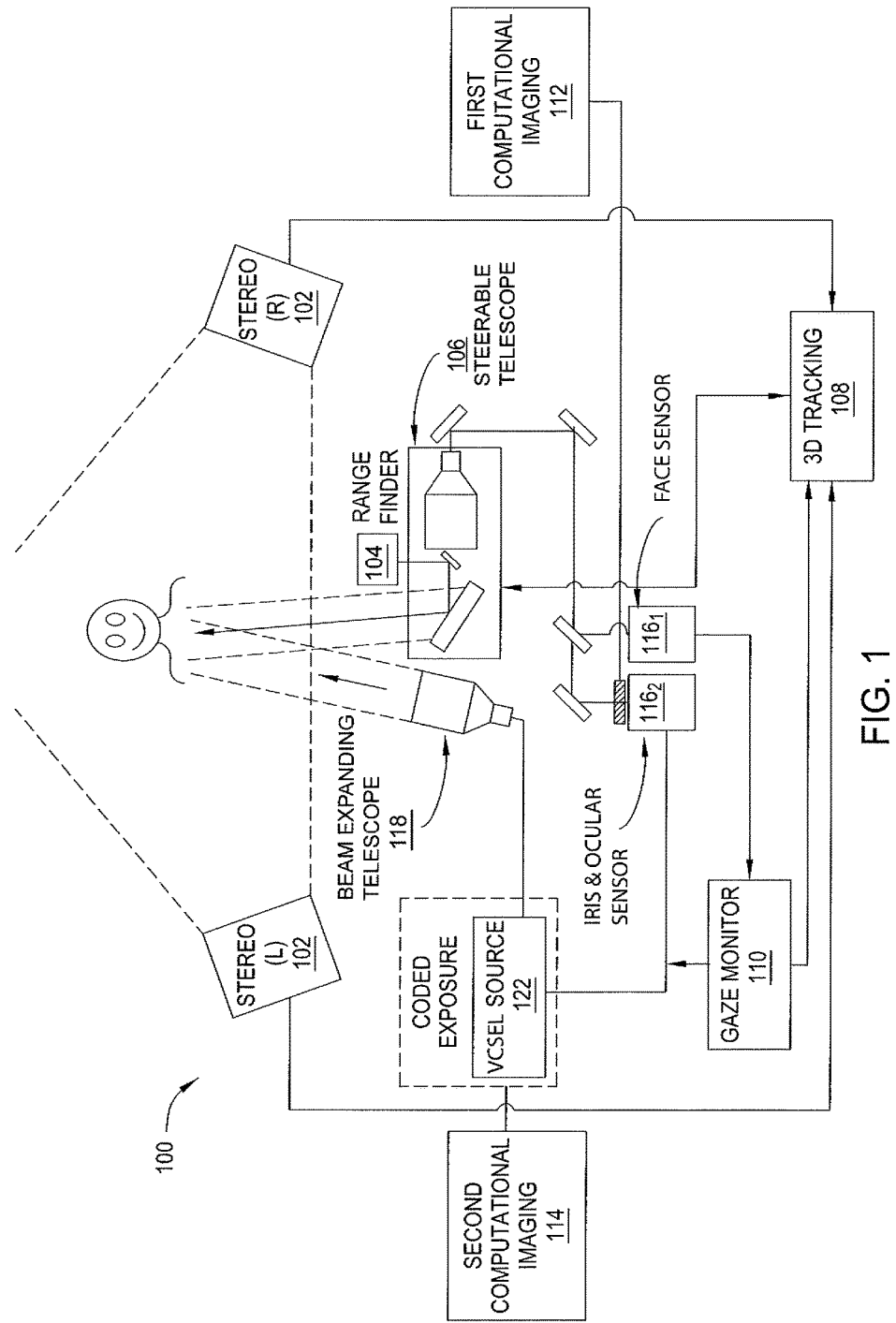
FIG. 1 is a high-level schematic diagram illustrating one embodiment of a facial and ocular acquisition system, according to the present invention.

FIG. 1 is a high-level schematic diagram illustrating one embodiment of a facial and ocular acquisition system 100, according to the present invention. The system 100 acquires a comprehensive subject identification dataset, including iris, ocular region, facial features, and facial texture data.

As illustrated, the system 100 generally comprises a wide field of view subject tracker 102, a range finder 104, a steerable telescope 106, a three-dimensional (3D) trajectory generator 108, a gaze monitor 110, a first computational imaging element 112, a second computational imaging element 114, a steerable beam expanding telescope 118, and a light source 122.

The subject tracker 102 comprises a camera that performs imaging and tracking of subjects. Specifically, the subject tracker 102 tracks multiple individuals within a given area, based on a set of detection criteria. In one embodiment, the detection criteria are based on physical shape and size. Thus, the subject tracker 102 may identify subjects for tracking based on analysis of their head and torso regions. Additionally, the subject tracker 102 computes image motion and range motion for a subject's head and facial regions (including nodding and/or bobbing motions). In one embodiment, the subject tracker 102 is a three-dimensional, stereo-based camera.

The range finder 104 is coupled to the subject tracker 102. The range finder 104 refines the range motion measurements made by the subject tracker 102. By combining image analysis and range analysis of the head region over time (e.g., a few seconds), a three-dimensional trajectory model of a subject's face and ocular region can be produced. The refined measurements from the range finder 104 are used to improve the range dimension of the trajectory model, which in turn may be used to predict the location of the subject's ocular region approximately two hundred milliseconds into the future. In one embodiment, the range finder 104 is a laser range finder.

The 3D trajectory generator 108 locates and tracks a subject's ocular region within the center of the steerable telescope's high-resolution field of view at a frame rate in excess of one hundred frames per second Specifically, logic controls in the 3D trajectory generator help determine where to aim the steerable telescope 106. The 3D trajectory generator 108 additionally generates a first feature trajectory that is later used to mitigate the effects of motion blur. Together, the subject tracker 102, the range finder 104, the steerable telescope 106, and the 3D trajectory generator 108 form a dynamic sub-system that moves with a subject. The 3D trajectory generator 108 contains a computer operating system running software that uses 3D subject position data from the subject tracker 102 and the range finder 104 to produce a continuous, 3D trajectory of the subject's head, ocular region, and pupil. In one embodiment, the 3D trajectory generator 108 records a history of time varying locations of Haar features for the head, ocular region and pupil identified by the subject tracker 102 and gaze analysis system 110. The Haar feature location histories are processed by a Kalman filter to generate trajectories that predict where the features will be located up to 500 milliseconds into the future. Those trajectories are then uploaded to a closed loop control system on the steerable telescope 106 to refine the gimbal and secondary mirror positions such that a subject's face is both in the steerable telescope's field of view and in focus.

The steerable telescope 106 is an automated steering and focusing telescope that has three degrees of freedom to control the altitudinal and azimuthal steering angles, and the position of the sensors in order to maintain focus on the subject. The three degrees of freedom are constrained by feature trajectories that are produced by the 3D trajectory generator 108 from subject position data returned by the subject tracker 102 and the range finder 104. The steerable telescope 106, which steers to the subject's head, simultaneously steers both fields of view of the first and second sensors $116_1$ and $116_2$. In one embodiment, the steerable telescope 106 is a F/5 Ritchey-Chretien telescope with a movable secondary mirror connected to an encoded DAC servo motor, an elliptical mirror that is mounted on a two-axis gimbal that is connected to two encoded DC servo motors, a closed loop motion controller for controlling the Gimbal servo motors and secondary mirror motor, and an asymmetric 25 mm focal length Plössl eyepiece that collimates light collected by the telescope, a 50-50 beamsplitter cube, and two objective lenses, one with focal length of 25 mm and a second with a focal length of 100 mm, that simultaneously create two distinct images of the same field of view at ×1 and ×4 magnifications with respect to the prime focus telescope image.

Two sensors $116_1$ and $116_2$ are positioned behind the objectives in the steerable telescope 106 in order to record digital images of the tracked subject. In one embodiment, the first sensor $116_1$ is a wide field/low resolution feature tracking sensor with a field of view of at least ten inches by ten inches, covered by no less than one thousand pixels by one thousand pixels. The first sensor $116_1$ creates an image of the subject's entire face at least one-hundred times every second and uploads all images to the gaze monitor 110 in real time. The second sensor $116_2$ is a narrow field/high-resolution ocular imaging sensor with a field of view of no more than eight inches by six inches, covered by no less than two thousand pixels by one thousand and five hundred pixels. The second sensor $116_2$ records single, high resolution images of the ocular region and iris only when triggered by the gaze monitor 110. In one embodiment, the first sensor $116_1$ is a BASLER A504k CCD array and the second sensor $116_2$ is a KODAK KAI-16000 interline CCD array.

The light source 122 is a speckle-free class-I infrared light source with a wavelength between 700 nm and 1550 nm. The light source 122 includes interlocks that prevent accidental exposure of a target to light levels that exceed those published by the American National Standards Institute (ANSI). Light emission from the light source 122 is synchronized with the short duration sensor exposures from both the low-resolution facial imaging first sensor $116_1$ and the high-resolution ocular imaging second sensor $116_2$. Emission from light source 122 is diffused and expanded to fill a steerable beam expanding telescope 118 that then collimates and directs the beam of light emission in a direction that is determined by the closed loop motion control system contained in the steerable telescope 106. Thus, the light source 122 is collimated and diffused to illuminate a subject's head located at a distance of greater than twenty meters from the steerable telescope 106. In one embodiment, the light source 122 is a high power array of pulsable Vertical Cavity Surface Emitting Lasers (VCSELs) with tunable pulse energy at 800 nm . Pulse durations of the light source 122 are between 100 microseconds and 100 milliseconds long. The steerable beam expanding telescope 118 is a F1 Fresnel lens with 100 grooves per inch and a diameter of 12.5 inches.

The gaze monitor 110 continuously identifies and tracks the motion of a subject's pupils in order to determine whether a subject is looking at the steerable telescope 106. In one embodiment, the gaze angle is determined by measuring the location of the specular glint relative to the subject's pupil circumference. Glint is created using a high-repetition strobe, no less than one hundred Hz and synchronized with the low-resolution first sensor $116_1$. In one embodiment, the high-repetition strobe is created by the light source 122 and directed to the subject by the steerable beam expanding telescope 118. The subject's pupils are identified through the brightness of the retinal reflection and the existence of symmetric pairs with respect to the symmetry axis of the subject's face.

When the subject is looking at the steerable telescope 106, the gaze monitor 110 activates the light strobe 122 in the steerable telescope 106 to switch states from a high-repetition/low energy per pulse state to a single-shot/higher energy per pulse state. Activation of the single-shot/higher energy per pulse state of the light strobe 122 in turn triggers acquisition of an image of the subject's iris by the high-resolution second sensor $116_2$. As a result of the high-resolution second sensor $116_2$ and the low resolution sensor $116_1$ being exposed using illumination from the same light source (i.e., light source 122) and sharing the same field of view created by the steerable telescope 106, the gaze monitor 110 additionally generates a second feature trajectory that is later used to mitigate the effects of motion blur contained in the high-resolution image of the subject's ocular region.

The first computational imaging element 112 adjusts the depth of focus of the steerable telescope 106. In particular, the first computational imaging element 112 refocuses the high-resolution ocular image captured by the second sensor $116_2$ of the steerable telescope 106. In one embodiment, the first computational imaging element 112 uses a trajectory generated by the subject tracker 102 and the range finder 104 during a focal sweep. The first computational imaging element 112 may use any one or more of a plurality of techniques to adjust the depth of focus, including the use of a focal sweep trajectory, a lattice-focal lens (i.e., a segmented lens array that produces an image that is a convolution of all of the projections of all of the lenses in the array), or a micro-lens array. These techniques control the position of the ocular image sensor during exposure The second computational imaging element 114 minimizes motion blur using the first and second feature trajectories. The second computational imaging element 114 may use any one or more of a plurality of techniques to minimize the motion blur, including coded exposure (e.g., using a sequence of illumination pulses emitted by the light source 122 that preserve high-frequency data, rather than a shutter that opens throughout exposure) and motion invariant photography (e.g., in which the camera is moved through exposures to generate a range of velocities by accelerating the camera, so that the blur becomes invariant to the subject's velocity). In one embodiment the second computational imaging element 114 is not a physical object, but rather a sequence of short pulses that controls the temporal emission pattern of the light source 122 during a high resolution exposure by the second sensor $116_2$.

Figure 2:
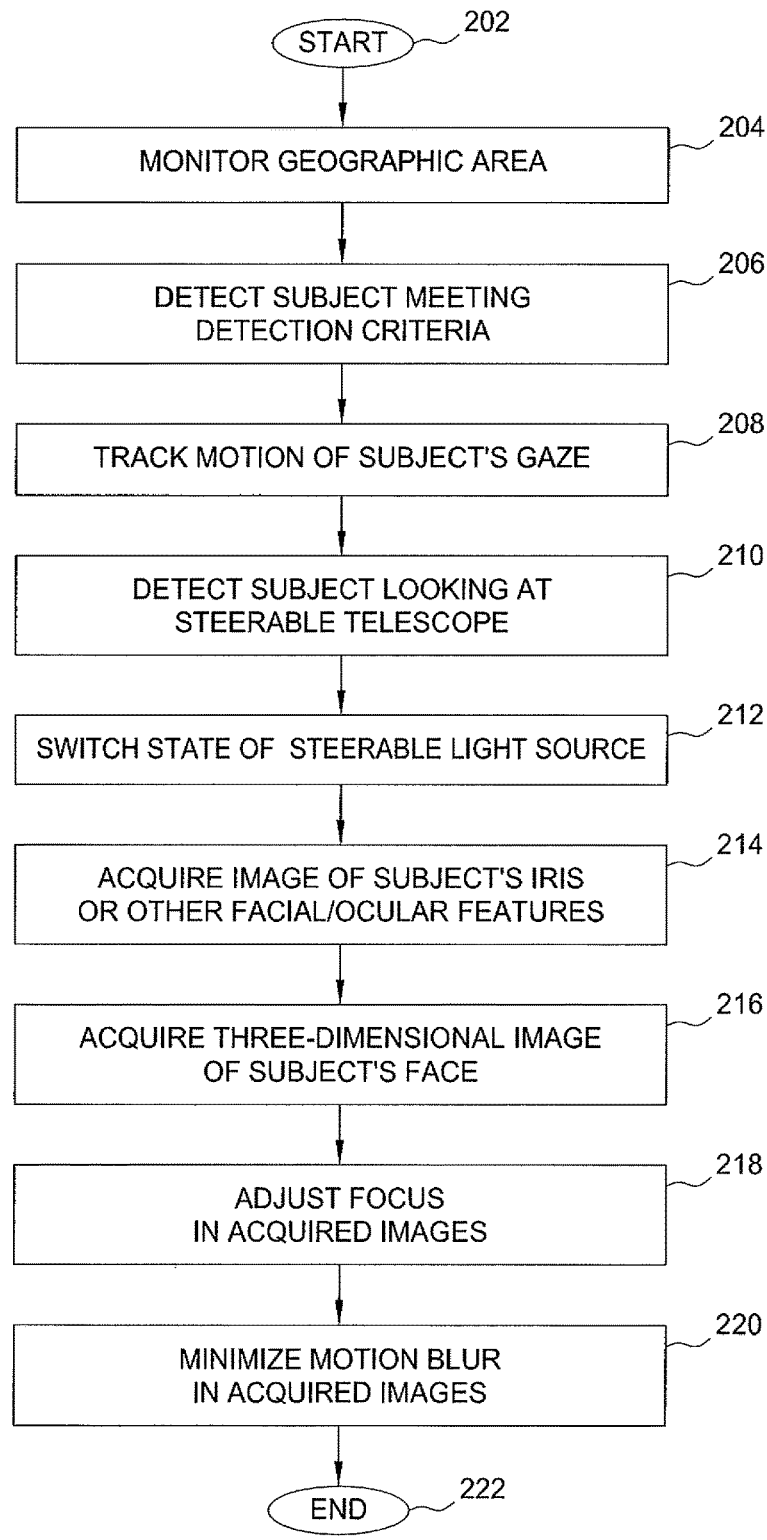
FIG. 2 is a flow diagram illustrating one embodiment of a method for facial and ocular acquisition, according to the present invention.

FIG. 2 is a flow diagram illustrating one embodiment of a method 200 for facial and ocular acquisition, according to the present invention. The method 200 may be implemented, for example, by the facial and ocular acquisition system 100 illustrated in FIG. 1. As such, reference is made in the discussion of the method 200 to various elements of the facial and ocular acquisition system 100. It will be appreciated, however, that the method 200 is not limited to implementation with a facial and ocular acquisition system configured exactly as illustrated in FIG. 1. That is, the method 200 may be implemented in facial and ocular acquisition system having configurations that differ from that illustrated in FIG. 1.

The method 200 is initialized in step 202 and proceeds to step 204, where the system 100 monitors a given geographic area. In step 206, the subject tracker 102 detects a subject that meets a given set of detection criteria (based, for example, on physical shape and size, as discussed above). In one embodiment, step 206 is performed by the subject tracker 102 operating in conjunction with the range finder 104.

In step 208, the gaze monitor 110 tracks the motion of the subject's gaze (e.g., pupils). In one embodiment, tracking of the subject's gaze utilizes a recognition technique that is based on the size and shape of the subject's head. In step 210, the gaze monitor 110 detects that the subject is looking at the steerable telescope 106. In one embodiment, the gaze of the subject is detected by monitoring for eye glint. This may be accomplished by observing the position of a specularly reflected near-infrared beam from the light source 122.

In step 212, the light source 122 switches from a low-energy/high pulse repetition rate state to a higher energy/ single pulse state in response to the subject looking at the steerable telescope 106. In step 214, the steerable telescope 106 acquires an image of the subject's iris (or other facial/ ocular features). In one embodiment, the locations of the subject's head, ocular region, and iris region within the field of view of the steerable telescope's first sensor $116_1$ are refined using visual image servoing before the image is captured.

In step 216, the steerable telescope's first sensor $116_1$ can be used to acquire a facial image of the subject suitable for feature analysis. In one embodiment, the facial image is acquired while waiting for the eye gaze trigger detected in step 210. In another embodiment, the facial image is acquired between acquisitions of iris images (e.g., step 214).

In step 218, the first computational imaging element 112 refocuses the depth of focus in the acquired images. In one embodiment, this refocusing is performed using feature trajectories generating by the subject tracker 102 and/or range finder 104, as discussed above. In one embodiment, refocusing is accomplished using one or more computational imaging techniques, such as the use of a lattice-focal lens and/or plenoptic camera created by placing a microlens array near the second sensor $116_2$.

In step 220, the second computational imaging 114 element minimizes the motion blur in the acquired images. In one embodiment, the motion blur is minimized using one or more computational imaging techniques, such as coded exposure or motion invariant photography.

The method 200 then terminates in step 222.

Figure 3:
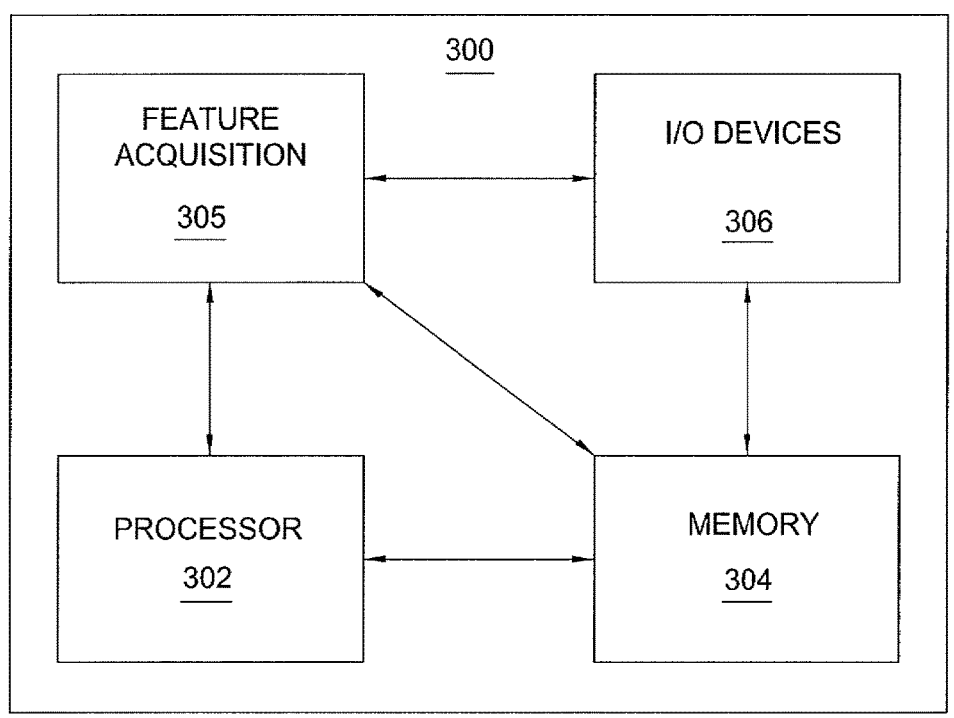
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. It is also important to note that the system can run autonomously or manually. Therefore, in one embodiment, a general purpose computing device 300 comprises a processor 302, a memory 304, a biometric feature acquisition module 305, and various input/output (I/O) devices 606 such as a display, a keyboard, a mouse, a modem, a microphone, speakers, a touch screen, a hybrid I/O device, and the like. In one embodiment, the touch screen is used by an operator to select the subject within a crowd of subjects who will be biometrically scanned. In one embodiment, at least one I/O device is a storage device (e.g., a disk drive, an optical disk drive, a floppy disk drive). In one embodiment, the facial and ocular acquisition proceeds automatically for all accessible subjects within the field of view.

Alternatively, embodiments of the present invention (e.g., I biometric feature acquisition module 305) can be represented by one or more software applications (or even a combination of software and hardware, e.g., using Application Specific Integrated Circuits (ASIC) or a Graphics Processing Unit (GPU)), where the software is loaded from a storage medium (e.g., I/O devices 306) and operated by the processor 302 in the memory 304 of the general purpose computing device 300. Thus, in one embodiment, the biometric feature acquisition 305 for performing long-range facial and ocular acquisition described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A system for acquiring an image of a facial feature of a subject, the system comprising:
   a source of spatially incoherent illumination comprising multiple emitters;
   a stationary diffuser for diffusing and expanding the spatially incoherent illumination to produce diffused illumination;
   a steerable telescope positioned to receive the diffused illumination from the diffuser and to collimate the diffused illumination into a beam directed at the facial feature, wherein the steerable telescope includes a low-resolution sensor configured to create an image of the subject's face and a high-resolution sensor configured to acquire the image of the facial feature, wherein the low-resolution sensor and the high-resolution sensor are both exposed by the same light source and share the same field of view;

a first computational imaging element configured to minimize an effect of defocus in the image of the facial feature;

a second computational imaging element configured to minimize an effect of motion blur in the image of the facial feature; and a gaze monitor for identifying a location of the facial feature and for tracking a gaze angle of the subject in a continuous manner including when the subject is looking in a direction other than at the steerable telescope and during an acquisition of the image, wherein the tracking is based on a position of glint relative to a pupil of the subject.

2. The system of claim 1, further comprising: a subject tracker for detecting the subject and guiding steerable telescope to focus on the subject.

3. The system of claim 2, wherein the subject tracker is a three-dimensional stereo-based camera.

4. The system of claim 2, further comprising a range finder for refining image motion and range motion measurements made by the subject tracker.

5. The system of claim 1, wherein a source of spatially incoherent illumination is a trigger-pulsed, speckle-free light source and the steerable telescope includes a Fresnel lens for collimating diffused illumination.

6. The system of claim 5, wherein the source of spatially incoherent illumination is a pulsable array of Vertical Cavity Surface Emitting Lasers (VCSELs).

7. The system of claim 1, further comprising:
a three-dimensional trajectory generator comprising logic controls to determine where to aim the steerable telescope; and
an executable program to generate trajectory predictions of a plurality of facial features of the subject, the plurality of facial features including an ocular region and pupils, within a field of view of the steerable telescope.

8. The system of claim 1, wherein the computing device is to determine a gaze angle by measuring the position of glint relative to a circumference of a pupil of the subject, and wherein the computing device is to identify the pupil based on a brightness of a retinal reflection and an existence of a symmetric pair with respect to a symmetry axis of a face of the subject.

9. The system of claim 1, wherein the first computational imaging element comprises an optical element.

10. The system of claim 9, wherein the optical element comprises a micro-lens array.

11. The system of claim 10, wherein the second computational imaging element uses a sweep of an independent optical element.

12. The system of claim 1, wherein the computing device is to monitor for eye glint and use the eye glint to detect the subject's gaze.

13. The system of claim 12, wherein the computing device is to monitor for eye glint by observing a position of a specularly reflected near-infrared beam emitted by the light source.

14. The system of claim 1, wherein the computing device is to control the image capture device to perform a focal sweep using a trajectory generated as a result of the tracking of the motion of the subject.

15. The system of claim 1, wherein the computing device is to initiate the coordination of the (i) control of the image capture device to capture a high resolution image of the subject's iris with (ii) control of the light source to emit a short duration high per-pulse energy light emission automatically in response to the gaze analysis indication that the subject is looking at the image capture device.

16. The system of claim 1, wherein when the gaze analysis indicates that the subject is looking at the image capture device, the computing device is to control the light source to emit a single short duration high energy light emission.

17. A system for acquiring an image of a facial feature of a subject, the system comprising:
a steerable telescope having a low-resolution sensor configured to create an image of the subject's face and a high-resolution sensor configured to acquire the image of the facial feature, wherein the low-resolution sensor and the high-resolution sensor are both exposed by the same light source and share the same field of view;
a high-repetition strobe synchronized with the steerable telescope for creating a glint in an ocular region of the subject; and
a gaze monitor-for tracking a gaze angle of the subject based on a position of the glint relative to a center of a pupil of the subject, and for identifying when the gaze angle indicates that the subject is looking at the steerable telescope-during an acquisition of the image, wherein the tracking is performed in a continuous manner, including when the subject is looking in a direction other than at the steerable telescope.

* * * * *